United States Patent [19]

Bendert et al.

[11] Patent Number: 5,668,958
[45] Date of Patent: Sep. 16, 1997

[54] HETEROGENEOUS FILING SYSTEM WITH COMMON API AND RECONCILED FILE MANAGEMENT RULES

[75] Inventors: Edward Joseph Bendert, Vestal; Robert Bradley Bennett, Endwell; Eve Suzanne Berman, Binghamton; Susan Marie Farrell; Eugene Johnson, both of Vestal; Robert Michael Nugent, Nichols; Mary Ellen Vendryes, Newark Valley, all of N.Y.

[73] Assignee: International Business Machines Corporation, Armonk, N.Y.

[21] Appl. No.: 526,937

[22] Filed: Sep. 12, 1995

[51] Int. Cl.⁶ .................................................. G06F 17/30
[52] U.S. Cl. ........................ 395/308; 395/309; 395/310
[58] Field of Search ............................ 395/608, 609, 395/610

[56] References Cited

U.S. PATENT DOCUMENTS

| | | |
|---|---|---|
| 4,780,821 | 10/1988 | Crossley . |
| 4,825,354 | 4/1989 | Agrawal et al. . |
| 4,887,204 | 12/1989 | Johnson et al. . |
| 5,142,674 | 8/1992 | Barker et al. . |
| 5,163,131 | 11/1992 | Row et al. . |
| 5,253,359 | 10/1993 | Spix et al. . |
| 5,263,155 | 11/1993 | Wang ................................ 395/608 |
| 5,276,879 | 4/1994 | Barry et al. . |
| 5,287,453 | 2/1994 | Roberts . |
| 5,303,375 | 4/1994 | Collins et al. . |
| 5,305,461 | 4/1994 | Feigenbaum et al. . |
| 5,313,646 | 5/1994 | Hendricks et al. . |
| 5,355,453 | 10/1994 | Row et al. . |
| 5,403,639 | 4/1995 | Belsan et al. . |
| 5,414,839 | 5/1995 | Joshi ........................................ 395/608 |
| 5,418,945 | 5/1995 | Carter et al. . |
| 5,434,994 | 7/1995 | Shaheen et al. . |
| 5,561,797 | 10/1996 | Gilles et al. ............................ 395/608 |
| 5,596,748 | 1/1997 | Kleewein et al. ...................... 395/610 |

FOREIGN PATENT DOCUMENTS

| | | |
|---|---|---|
| 0566895 | 10/1993 | European Pat. Off. . |
| 0588502 | 3/1994 | European Pat. Off. . |
| 2269920 | 2/1994 | United Kingdom . |

*Primary Examiner*—Wayne Amsbury
*Attorney, Agent, or Firm*—Arthur J. Samodovitz

[57] ABSTRACT

A computer system manages first and second different file systems. The system comprises first and second, different file managers having first and second different APIs for the first and second file systems, respectively. The system also comprises a hybrid file manager for managing the second file system based on requests made using the first API. The hybrid manager applies rules from both APIs to control atomicity of requests, access concurrency, and data consistency rules. The hybrid rules prevent violation of the rules of either API.

22 Claims, 11 Drawing Sheets

HETEROGENEOUS FILING SYSTEM WITH COMMON API AND RECONCILED FILE MANAGEMENT RULES

BACKGROUND OF THE INVENTION

The invention relates generally to computer systems and deals more particularly with management of shared, heterogeneous files for access by heterogeneous clients.

Various file systems are known today, each with a unique set of file management rules. Known file systems include the Shared File System within IBM VM/ESA operating system and a UNIX (™ of Bell Laboratories) file system, an IBM AIX file system. The file management system defines rules for atomicity of requests, data filing sharing and access concurrency, data change consistency, etc.

"Atomicity of requests" relates to when updates are committed or rolled-back. "Commitment" of updates means to make them permanent such as by writing the updates to permanent storage. A rollback causes temporary information kept for update request processing to be deleted because there will be no permanent storage update. In some file systems, such as those which are POSIX compliant, after each user update request is completed, the update is automatically committed if successful or rolled back if unsuccessful regardless of whether the user will soon make related updates. Thus, each update request is atomic. In other file systems, such as the Shared File System, the file system may not commit or rollback an update request until specifically requested by the user. Moreover, the user can make a group of related, sequential update requests to one or more files in a "work unit", and defer the decision/request to commit or rollback until determining the outcome of all the update requests. Typically, the user will request commit if all the related update requests are successful and request rollback of all the update requests if any one was not successful. Thus, the work unit comprising the group of related updates is "atomic".

"Data filing sharing and access concurrency" relates to control of the number and types of concurrent access that are permitted for a file or data block. For example, some file systems permit for a file or part of a file, multiple concurrent readers with multiple concurrent writers while others allow multiple concurrent readers with a single writer. Other file systems permit multiple concurrent writers of a file as long as the concurrent writers are not concurrently writing to the same part of a file.

"Data change consistency" relates to control of when updates are presented to other clients who are currently reading or will subsequently read a file which has been updated. For example, some file systems will not present any file updates to a concurrent reader until the reader closes the file and subsequently requests to open the file again. Other filing systems, will present file updates to concurrent readers as soon as these updates are committed.

There are many other file management rules that are specific to each file system such as authorization rules, directory structures, locking, granularity of access, etc.

Each file system may also have a unique application program interface (API). The API for a file system includes the set of requests or operations that are used by applications, human operators, or by the operating system on behalf of applications and human operators, to communicate requests to the file system. The API also comprises the rules or semantics of behavior of the file system, i.e., the effects of various file system requests on objects in a file system repository. While the semantics may differ significantly between different file systems, the basic requests/operations may be similar and include open, read, write, close, query object status, etc.

Some computer systems utilize two or more file systems with different APIs and different file management rules. Some users, such as an administrator, may require access to different file systems and the access to the different filing systems may be concurrent and involve related work requests. According to the prior art, the administrator used different APIs for the different, respective file systems, and each file system enforced its own rules independent of the other file system. This created two problems. First, the administrator was required to know both APIs and utilize the proper API for each request. Second, for related work requests involving the different file systems, the file management rules of the different file systems may yield a result that violates the file management rules of one of the file systems. In addition, it is advantageous in many cases for multiple file systems to share a common data repository, such repository comprising a file server environment and permanent storage for file system objects and data. When file systems have a common repository, it is even more compelling that they have a single set of administrative operations for managing that common repository, i.e. a single API to the file server that hosts the multiple file system repository.

Accordingly, a general object of the present invention is to provide a file management system with a common API for accessing two different file systems and with controls to ensure that the rules of each files system are not violated.

SUMMARY OF THE INVENTION

The invention resides in a computer system for managing first and second different file systems. The system comprises first and second, different file managers having first and second different APIs for the first and second file systems, respectively. The system also comprises a hybrid file manager for managing the second file system based on requests made using the first API. The hybrid managing means applies rules from both APIs to control atomicity of requests, access concurrency, and data consistency rules. The hybrid rules are generally the more restrictive rules of both the first and second APIs to prevent violation of the rules of either API.

According to other features of the present invention, the first API requires an explicit commit request and the second API presumes a commit request resulting from an explicit successful update request, and the hybrid rules support a combined close and commit request or a rollback request. The first API serializes requests to open for write at a file level, the second API permits concurrent opens for write at a file level, and the hybrid rules serialize requests to open for write at a file level. The first API does not present committed updates to a concurrent reader until after the concurrent reader closes the respective file and reopens the respective file, the second API presents updates to a concurrent reader after the updates are commited and before the concurrent reader closes the respective file, and the rules of the hybrid managing means does not present committed updates to a concurrent reader until after the concurrent reader closes the respective file and reopens the respective file.

DETAILED DESCRIPTION OF THE PREFERRED EMBODIMENTS

Figure 1:
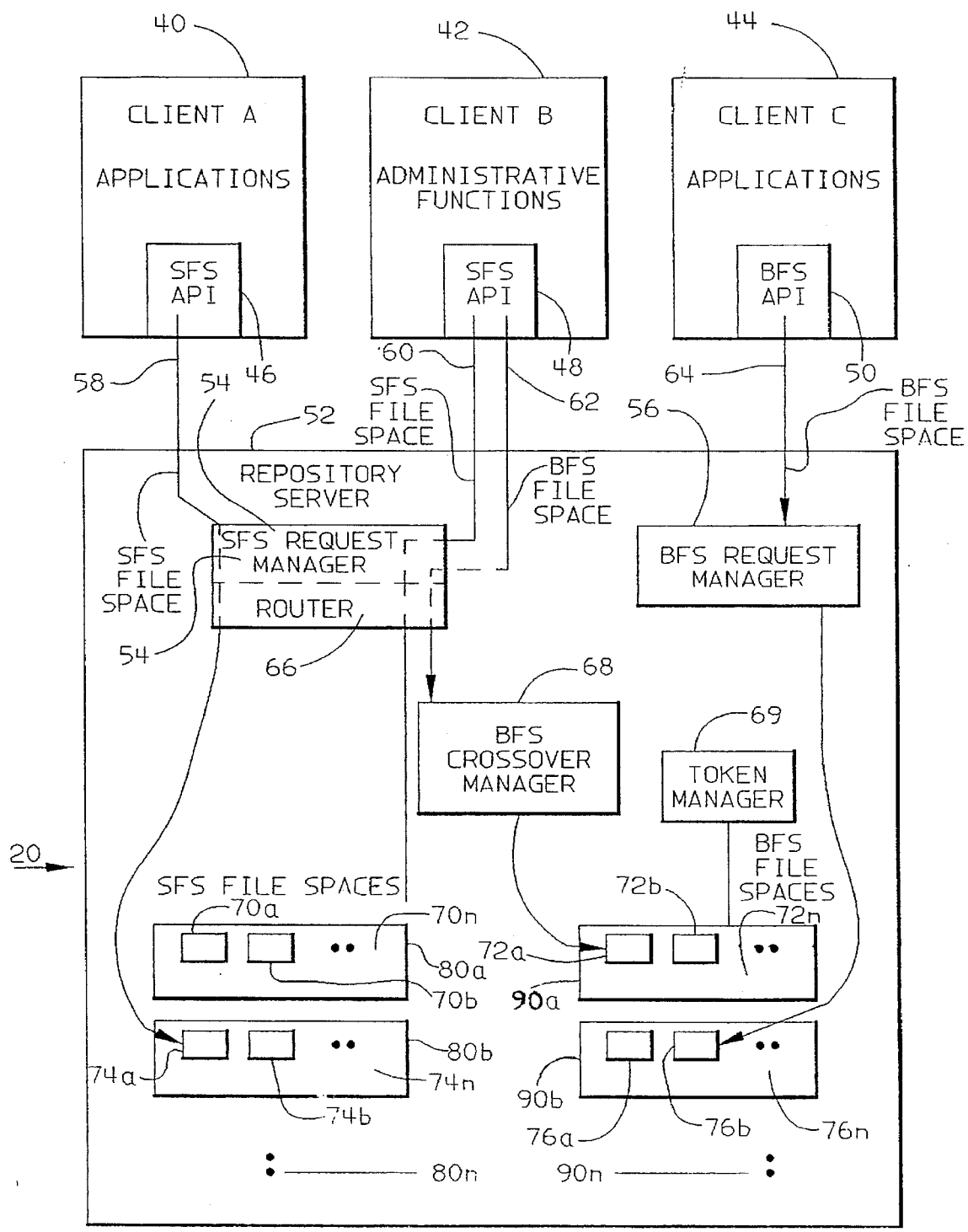
FIG. 1 is a block diagram of computer system embodying the present invention.

Referring now to the drawings in detail wherein like reference numbers indicate like elements throughout, FIG. 1 illustrates a computer system generally designated 20 according to the present invention. Computer system 20 comprises a server 52 and a multiplicity of clients such as application or user client 40, administrator client 42 and application or user client 44. By way of example, the clients are workstations and associated applications on a network and the server is either another workstation and associated application on the network or a mainframe computer and associated application interconnected to the network. Alternately, the clients and server can each be virtual machines in the same real machine. (A "virtual machine" is a logical division of the main frame computer to divide the processor time, memory and other computer resources amongst the virtual machines. Each virtual machine appears to the user to be a real machine dedicated to the user and can execute user applications although there may be some apparent delays in responding to a user request when the real processor is occupied with a request from other virtual machines.) In the illustrated embodiment, application client 40 utilizes a Shared File System API function 46, administrator client 42 utilizes a Shared File System API function 48 and application client 44 utilizes a Byte File System API function 50. As noted above, each API for a file system includes the set of requests or operations that are used by applications, human operators, or by the operating system on behalf of applications and human operators, to communicate requests to the file system.

The following are key requests and operations of the basic Byte File System API:

| | |
|---|---|
| Access | See if object can be accessed |
| Cancel | Cancel a waiting pipe or lock request |
| Chaudit | Change the object audit flags |
| Chmod | Change the file/directory authorities |
| Chown | Change the file/directory ownership |
| Close | Close a file |
| Closedir | Close a directory |
| Link | Create a link to a file |
| Lockby | Obtain byte range lock |
| Lookup | Get identifier of name, and name of identifier |
| Mkobj | Create a directory or file |
| Open | Open a file |
| Pipe Access | Verify Access permission for a Named Pipe |
| Pipe Close | Close a named pipe |
| Pipe Open | Open a named pipe |
| Pipe Read | Read bytes from a named pipe |
| Pipe Stat | Obtain Named pipe status info |
| Pipe Utime | Update Named pipe timestamps |
| Pipe Write | Write to a named pipe |
| Opendir | Open a directory |
| Read | Read bytes from an open file |
| Readdir | Read an entry from a directory |
| Readlink | Read the value of a symbolic link |
| Rename | Rename a file or directory |
| Rmdir | Remove a directory |
| Softlink | Create a symbolic/external link |
| Tokretrn | Return a cache token |
| Tslockby | Tests byte range lock conflict |
| Unlink | Remove a directory entry |
| Unlockby | Unlock a byte range lock |
| Utime | change file/directory time attributes |
| Write | Write to an open file (including truncate) |

The following are key requests and operations of the basic Shared File System API:

| | |
|---|---|
| CLOSE | Close a file |
| CLOSEDIR | Close a directory |
| COMMIT | Commit |
| GETDIR | Get directory |
| GETDIRE | Get a directory entry |
| LOCK | Create a lock |
| OPEN | Open a file |
| OPENDIR | Open Directory |
| READ | Read a file |
| ROLLB | Rollback work |
| UNLOCK | Delete a lock |
| WRITE | Write to a file |
| CONNECT | Connect to the server |
| CRDIR | Create a directory |
| CRALIAS | Create an alias |
| DELETE | Delete a file or alias |
| DELDIR | Delete a directory |
| FCOPY | Copy a file |
| GRANT | Grant authority |
| RELOC | Relocate an object |
| RENAME | Rename an object |
| REVOKE | Revoke authority |
| ADDSTR | Add storage to filespace |
| CHANGETH | Change threshold |
| DELSTR | Delete storage from filespace |
| GRANTADM | Grant administrator authority |
| GRANTU | Enroll user |
| QADMINS | Query administrators |
| QCONUSRS | Query connected users |
| QENUSERS | Query enrolled users |
| QUSTOR | Query user space |
| REVADM | Revoke administrator authority |
| REVOKEU | Delete user |
| CREXTOBJ | Create external object |

However, it should be noted that the type of APIs and respective file systems used in the present invention can be much different than the Byte File System and Shared File System if desired.

The server 52 provides a variety of services to the clients, such as storage and management of Shared File System files 70a,b . . . n, 74a,b . . . n and Byte File System Files 72a,b . . . n, 76a,b . . . n. Files 70a,b . . . n, 74a,b . . . n are shared by clients 40 and 42 and files 72a,b . . . n, 76a,b . . . n and 44 are shared by clients 42 and 44. A "file" comprises actual data and metadata—control information such as size, type, date of last change, etc. of the actual data. For more details of the clients and server, reference can be made to U.S. patent application entitled "Optimized Read Ahead in Token Managed System" filed by Robert B. Bennett et al. on Sep. 7, 1995 and hereby incorporated by reference as part of the present patent application.

The illustrated embodiment includes a Shared File System request manager 54 and a Byte File System request manager 56 (although there could be other types as well corresponding to other types of file systems). The files 70a,b ... n and 74a,b ... n and other file system objects of the Shared File System are stored in file spaces (80a,b, ... n). File spaces are named "containers" comprising logical space for files of one particular type. File spaces are used to manage logical space consumption as well as distinguish a group of objects of like type, i.e., to distinguish the Shared File System objects from the Byte File System objects. Thus, an address of a file within a file space indicates the type of file. The logical distinction between a set of objects of one file system and a set of objects of another file system in the same object repository is the type of file spaces assigned to those objects. In FIG. 1, for example, Shared File System file spaces 80a,b, ... n are Shared File System type file spaces and file spaces 90a,b ... n are Byte File System type file spaces.

Operations or requests sent to the server environment 52 normally address objects to indicate which object is affected by the operation. Part of the identification of an object in a file system, directly or indirectly, is the name of the file space that hold the object. Thus it can be determined through an object identifier or through other object-related information, the file space with which the object is associated. Once this association is determined, the file system that owns the object is known because the file spaces are "typed" by the file system, as discussed previously. When an operation or request arrives in the server 52, it is routed to one of the request managers, either the Shared File System request manager 54 or the Byte File System request manager 56, depending on the type of API used by the requestor in the request. Within the Shared File System request manager 54, a router function 66 further determines if the Shared File System API operations affects a Shared File System object or a Byte File System object. This determination is based on the file space which is addressed by the request as described previously.

Further, the router function 66 within the Shared File System request manager routes requests exhibiting the Shared File System API for access to a Byte File System object, to a Byte File System crossover manager 68 and the crossover manager 68 manages this access to the Byte File System file.

Atomicity of Requests

As noted above, when a client 40 using the Shared File System API requests an update (or object change), this does not automatically imply a request to commit the update if successful or a backout if unsuccessful. Rather, the client 40 must explicitly request the commit or backout of the update. If a single update is unrelated to other updates, the client may request the commit or backout independently of other update requests. However, if there are multiple, related update requests, called a "work unit", the client will likely postpone the commit or backout request until all updates are attempted. If all update requests are successfully completed, then the client will likely request commit. However, if any one update is not successfully completed, then the client will likely request rollback of any updates that were completed and management information asociated with all the update requests.

Figure 2:
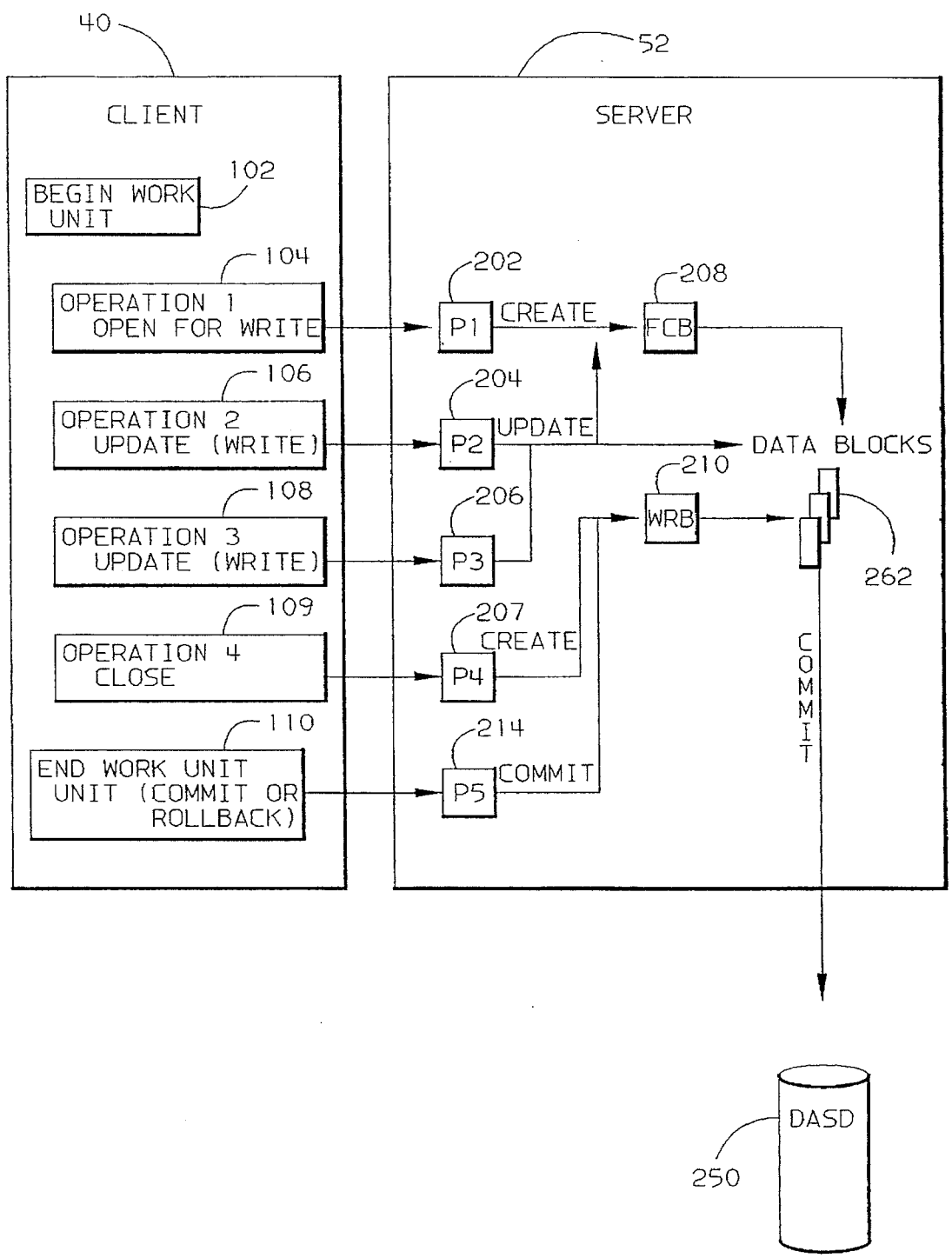
FIG. 2 is block diagram/flow chart of operations using the Shared File System API on a Shared File System object within the computer system of FIG. 1.

FIG. 2 illustrates an example of a work unit and associated data structures initiated by client 40 using the Shared File System API for a Shared File System file. First, an application within client 40 requests that a new work unit be created (step 102), and in response, the client operating system selects a work unit ID and initializes associated control blocks. (In other cases, work units can be initiated by the client operating system without application input.) Then the application within the client 40 makes a request to open a file 70a within the Shared File System file space 80a and the client sends the open request to the server 52 (step 104). This initiates a server process 202 which recognizes, either explicitly via a client request parameter or implicitly via server work unit status control structures, that this is the first operation of a new work unit. In response to the open request, process 202 creates a file control block (FCB) 208 to represent the open file and hold associated control information. (When subsequent file update operations cause changes to the file status or file data, the FCB will be updated to reflect the changes. Such changes include identifiers of data blocks that are affected by such update operations. These data block identifiers can be used to locate data blocks 262 in the server memory where the updated blocks reside before commit.) Client 40 then makes a first update request (step 106), and in response a server process 204 updates the FCB 208 and the affected data blocks 262 accordingly. After this and each subsequent update request is attempted, the respective server function also notifies the user client whether the update was successful. Client 40 then makes a second, related update request (step 108), and in response a server process 206 updates the FCB and the affected data blocks accordingly. In the illustrated example, client 40 then makes a close request (step 109) (although client 40 could have continued with other update or read requests), and as a result, a server process 207 creates a work request block (WRB) 210 using current information from the FCB 208, and then deletes the FCB. Next, client 40 requests to commit or rollback the updates and end the work unit (step 110). In response, a server process 214 processes each WRB that is associated with this client and work unit. For a commit request, process 214 causes object information to be updated on permanent storage 250, and causes file blocks 262 to be written to permanent storage 250. The update of data blocks is accomplished by finding the data blocks 262 that were changed, using identifiers in the WRBs 210 and then writing the changed blocks to permanent storage (DASD) 250. In the case of a rollback, process 214 deletes the WRB 210 without updating the permanent storage 250. Thus, the commit or rollback was requested for a group of related work requests using the Shared File System API for a Shared File System object. If desired, the client could have opened a second file after closing but before committing or rolling back the updates to the first file, made updates to the second file within the same work unit that was created for the first file, closed the second file and then requested commit or rollback of the updates to both files, i.e. all updates within the work unit. However, if there was just one update request to be made such as request 104, then the next request could have been to close the file, and the final request could have been to commit or rollback the single update. Open, update, close and commit or rollback requests from client 42 using the Shared File System API for a Shared File System file are processed in the same manner.

Figure 3:
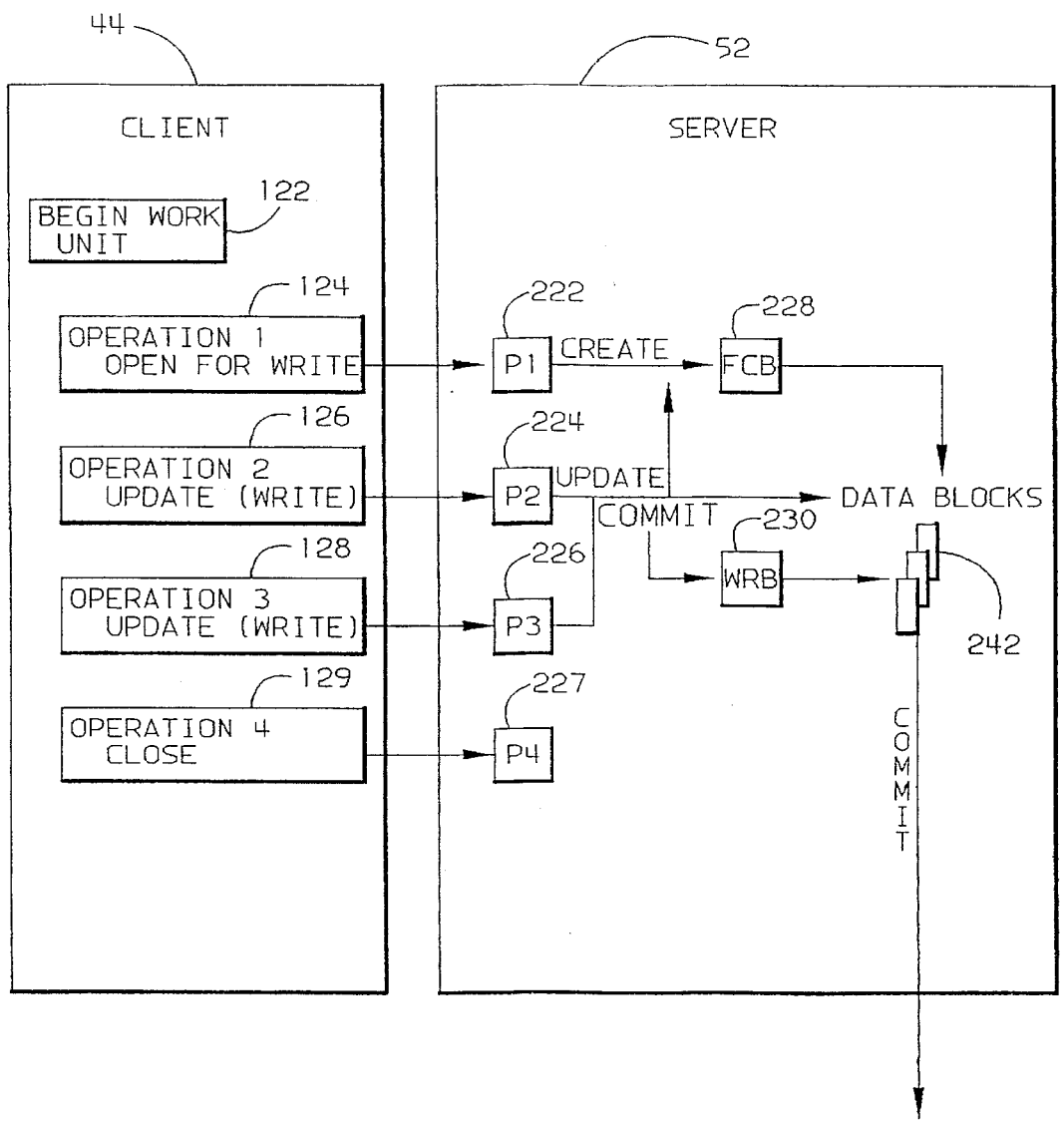
FIG. 3 is block diagram/flow chart of operations using the Byte File System API on a Byte File System object within the computer system of FIG. 1.

FIG. 3 illustrates an example of work operations and associated data structures initiated by client 44 using the Byte File System API for a Byte File System file. An application within client 44 makes a request to open a Byte File System file and in response, the client 44 sends the open request to the server 52 (step 124). In response, a server process 222 creates an FCB 228 to represent the open file and hold associated control information. The application within client 44 then makes an update request and the client 44 sends the update request to the server (step 126). In response, a server process 224 updates the corresponding data blocks 242 in the server memory and creates a WRB 230 using current information from the FCB 228. If the request was successful, the server process 224 automatically commits the update by causing object information to be updated on permanent storage 250, and causing file updates to be written to permanent storage 250. The update of data blocks is accomplished by finding the data blocks 242 that were changed, using identifiers in the WRBs 230 and then writing the changed blocks to permanent storage 250. Then, process 224 deletes the WRB 230. If the update was not successful, the server process 224 rolls back the request by deleting the WRB 230 without updating the permanent storage 250. After step 128, the client requests to close the file 129, and in response a server process 227 erases the FCB 228. Thus, each update request is automatically committed if successful or rolled back if unsuccessful immediately and independently of other update requests. (In an alternate environment, the application does not explicitly request to open the file before requesting an update. Rather, the application merely requests to update the file and from that update request, the client machine generates open request 124 and then write request 126.)

In addition to receiving requests from clients 40 and 42 using the Shared File System API to access a Shared File System file and from client 44 using the Byte File System API to access a Byte File System file, the request manager 54 receives and processes requests from administrator client 42 using the Shared File System API to access a Byte File System file. Processing of such requests from client 42 is done in a manner which avoids violation of file management rules of either the Shared File System or Byte File System. To accomplish such processing without violating the file management rules of either file system, the following general rules are enforced in the preferred embodiment for use of the Shared File System API to access a Byte File System file:

1. Whereas the individual file system commit rules directly conflict:

Byte File System file update requests from the Byte File System API are committed individually to allow interleaving updates to the same file by shared write operations, and Shared File System update requests from the Shared File System API can be combined in a work unit, either with other updates to the same or different files.

Byte File System update requests from the Shared File System API are committed when the associated file is closed, but cannot be combined in a work unit with changes to other files. This relaxation of the Byte File System rule is justified by:

a complementary Shared File System atomicity rule, described previously, whereby opens from the Shared File System API follow the Shared File System rules of allowing only a single write type open for a particular file at a time. This means that there can be no interleaving of individual Byte File System updates to a file in the same work unit from the Shared File System API; therefore, the primary reason for the single update rule for the Byte File System file can be relaxed to extend to the close of that single file.

a better conformance to the Shared File System rules for combining updates into a single work unit.

2. Nevertheless, there is still no combination of updates to a Byte File System file and a Shared File System file in the same work unit.

3. Shared File System file close operations allow options to commit, rollback, or (default) continue the work unit even after the close of the file, but Byte File System API offers no option on close of a file to continue the work unit. For rollback of Byte File System file changes (updates), rollback operation is allowed. This can be requested in lieu of the close, causing a cancellation (clean up) of the work unit, implicit close, with no updates to permanent storage.

Figure 4:
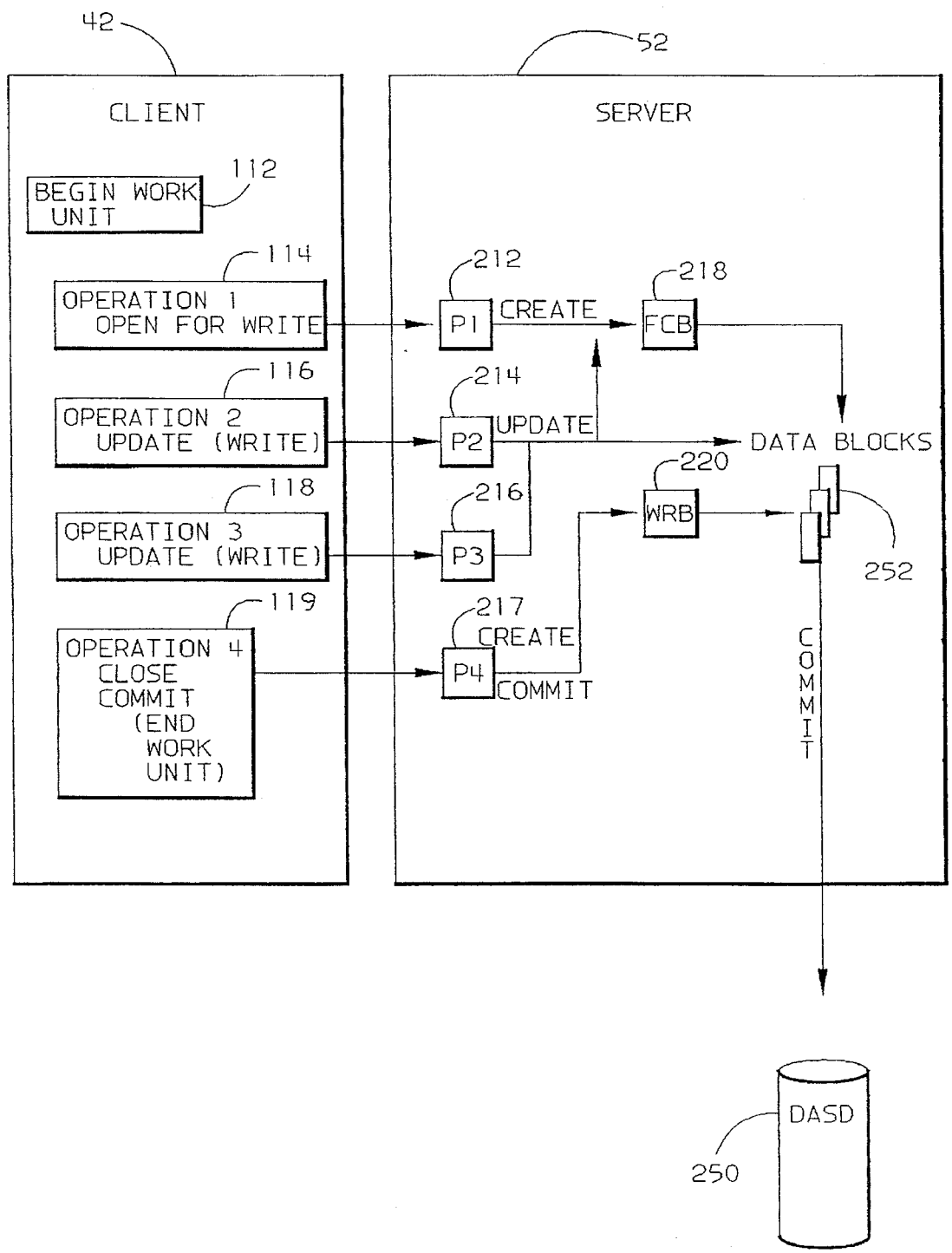
FIG. 4 is block diagram/flow chart of operations using the Shared File System API on a Byte File System object within the computer system of FIG. 1.

FIG. 4 illustrates an example of a work unit and associated data structures initiated by client 42 using the Shared File System API for a Byte File System file. First, an application within client 42 requests that a new work unit be created (step 112), and in response, the client operating system selects a work unit ID and initializes associated control blocks. Then the application within the client 42 makes a request to open a file 72a and the client sends the open request to the server 52 (step 114). This initiates a server process 212 which recognizes, either explicitly via a client request parameter or implicitly via server status control structures, that this is the first operation of a new work unit. In response to the open request, process 212 creates an FCB 218 to represent the open file and hold associated file control information such as file status and identifiers of data blocks that are subsequently affected by update operations. These data block identifiers can be used to locate data blocks 252 in the server memory where the updated blocks reside before commit. Client 40 then makes a first update request (step 116), and in response a server process 214 updates the FCB 218 and the affected data blocks 252 accordingly. After this and each subsequent update request is attempted, the respective server function notifies the user client whether the update was successful. Client 40 then makes a second update request (which may be related to the first update request) (step 118), and as a result a server process 216 updates the FCB 218 and the affected data blocks accordingly. In the illustrated example, client 40 then makes either a close or rollback request (step 119) (although client 40 could have continued with other update or read requests), and in response, a server process 217 creates a WRB 220 using current information from the FCB, and then deletes the FCB. In the case of a close request, this also implies a commit request, so the server process 217 also causes object information to be updated on permanent storage 250, and causes file updates to be written to permanent storage 250. The update of data blocks is accomplished by finding the data blocks 252 that were changed, using identifiers in the WRBs 220 and then writing the changed blocks to permanent storage 250. Then, the server process 217 deletes the WRB 220 and the FCB. In the case of a rollback request (instead of the close and implied commit request), process 217 deletes the WRB 220 without updating the permanent storage 250. Thus, the commit or rollback was implemented for one or more update requests but all within a single file. (In an alternate environment, the application does not explicitly request to open the file before requesting an update. Rather, the application merely requests to update the file and from that update request, the client machine generates open request 114 and then write request 116.)

Figure 5:
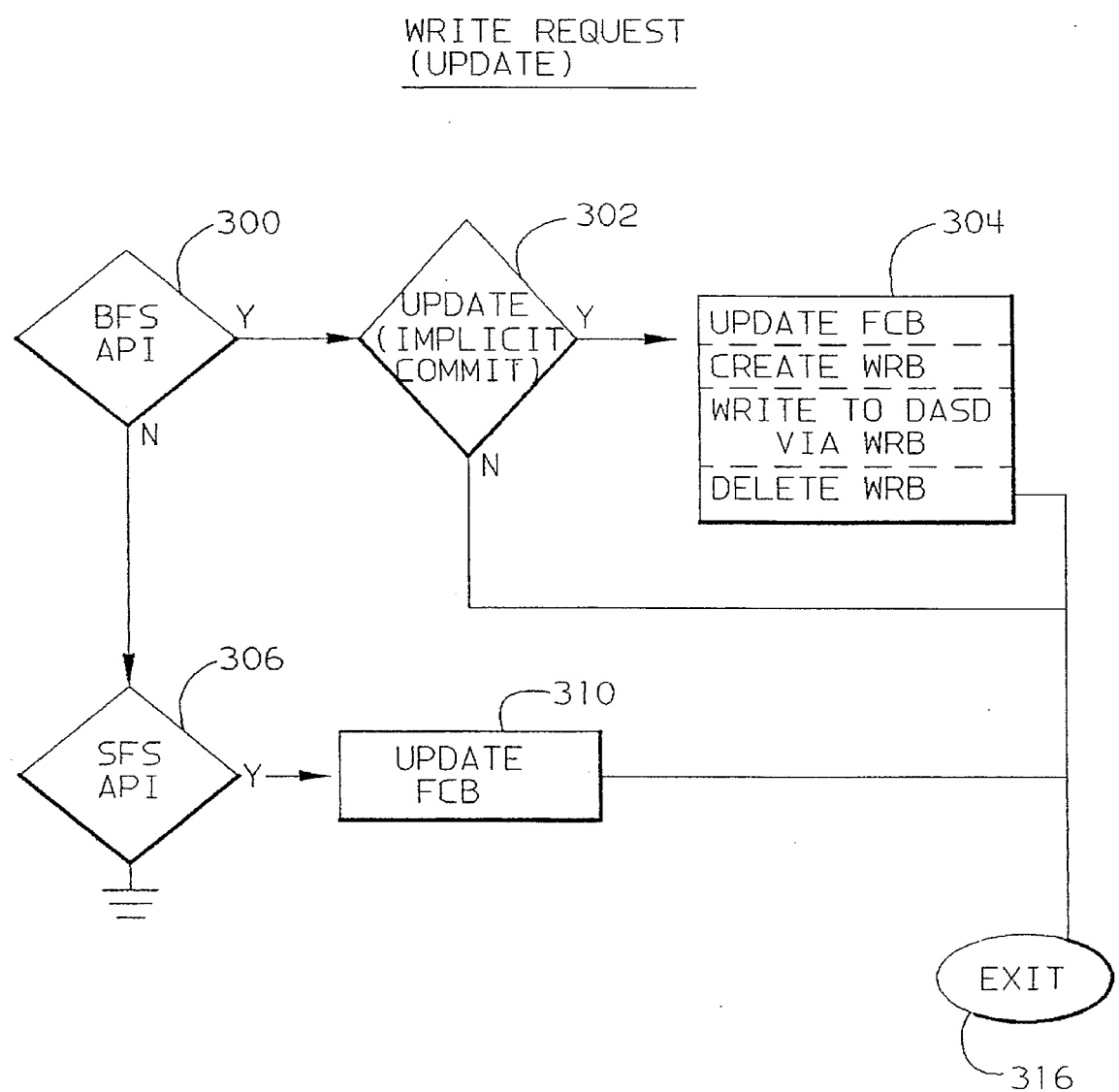
FIG. 5 is a flow chart illustrating processing of write requests within the computer system of FIG. 1.

FIG. 5 is a flow chart illustrating in more detail the foregoing processing by server 52 of an update request from client 40, 44 or 42. In decision 300, the server determines if the request is from a Byte File System API, and if so, routes it to the Byte File System request manager 56. Request manager 56 then determines if the request is for update with implied commit (decision 302). If so, the request manager 56 updates the FCB, creates the WRB, writes the updates to DASD based on the WRB and then deletes the WRB (step 304). Referring back to decision 302, if the request was not for update, then the request manager processes the request without creating a WRB or committing a change to DASD, then exits (316) having handled the request.

Referring back to decision 300, if the request was not made using the Byte File System API, the server determines that the request was made using the Shared File System API (decision 306) and routes the request to the Shared File System request manager 54. In the case of a Shared File System object, the request manager 54 creates/updates a file control block (step 310) and then exits. In the case of a Byte File System object, the request manager 54 calls the crossover manager 68 via the router 66 to perform this create/update function via the router 66 and then exits.

Figure 6:
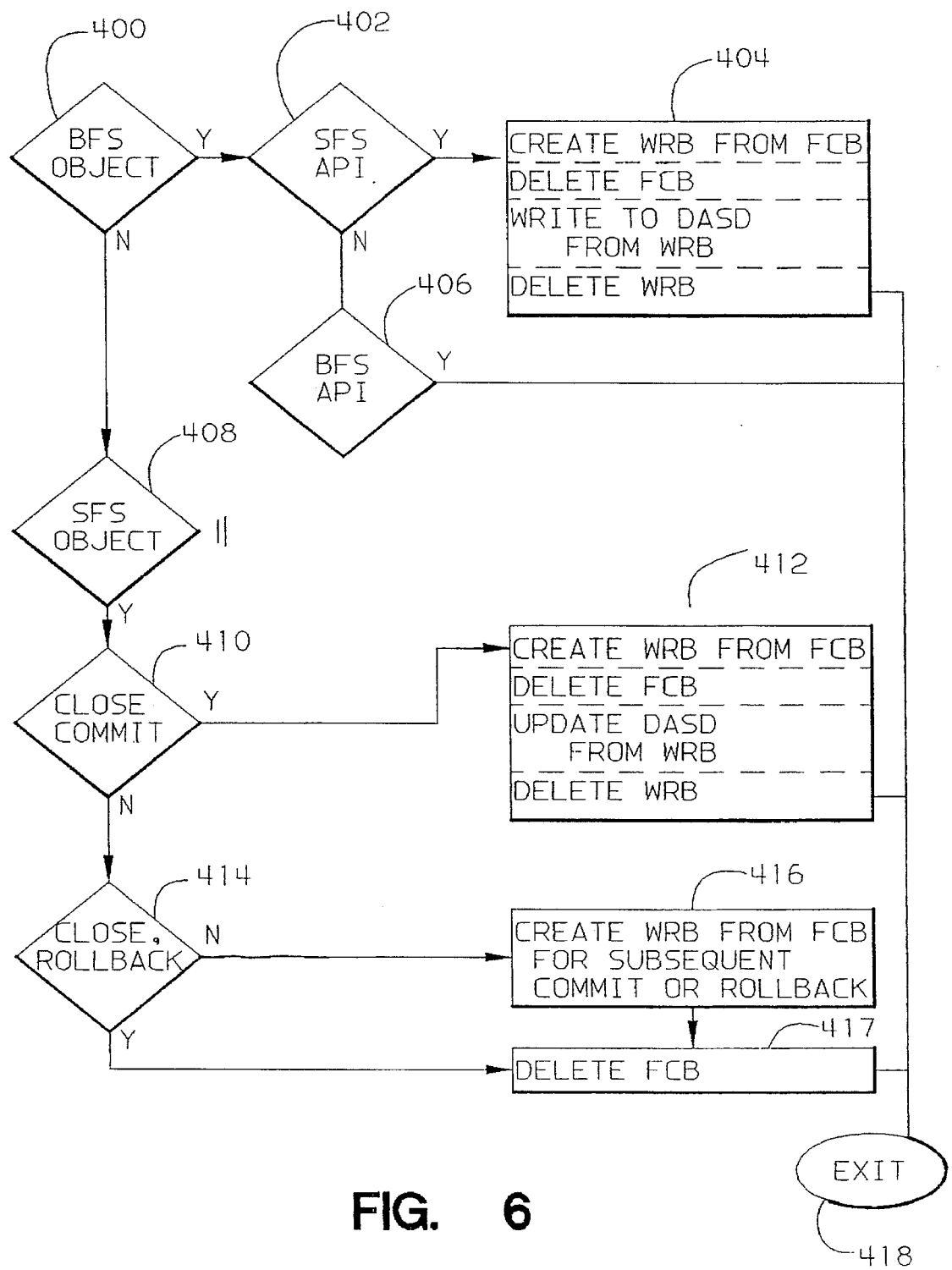
FIG. 6 is a flow chart illustrating processing of close requests within the computer system of FIG. 1.

FIG. 6 is a flow chart illustrating in more detail the foregoing processing of a close request following one or more write requests. In decision 400, the server determines if the close request is for a Byte File System object, and if so, determines if the request was made using the Shared File System API (decision 402). If so, the server routes the request to request manager 54. In response, request manager 54 calls the crossover manager 68 via the router 66 to create a WRB from the FCB, then delete the FCB, then write the updates to DASD based on the WRB and then delete the WRB (step 404). However, if the close request was made using the Byte File System API, then step 404 is not necessary (decision 406) because the last update was committed when the update was made.

Referring again to decision 400, if the close request was not for a Byte File System file but for a Shared File System file (decision 408), then the server routes the request to the request manager 54. In response, request manager 54 determines if the client has also requested a commit (decisions 408 and 410). If so, the request manager 54 creates WRBs from the FCBs, then deletes the FCBs, then updates DASD based on the WRBs and then deletes the WRB (step 412). However, if the client requested close with rollback (decision 414), then the request manager deletes the FCB (step 417) and exits; otherwise the request manager (defers the end of the work unit) creates the WRB from the FCB for a possible subsequent commit or rollback request (step 416) and then deletes the FCB (step 417).

Figure 7:
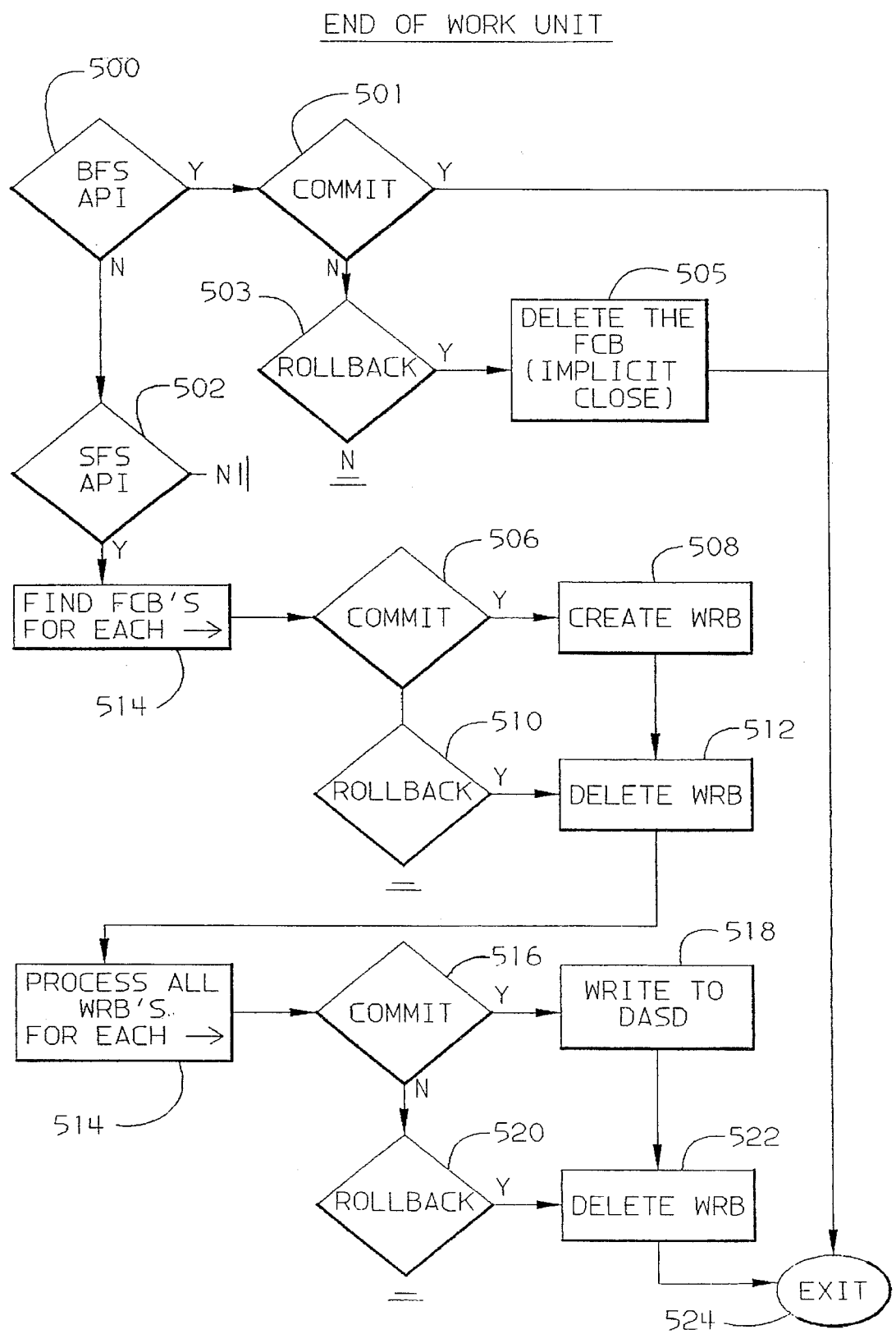
FIG. 7 is a flow chart illustrating processing of end of work unit requests within the computer system of FIG. 1.

FIG. 7 is a flow chart illustrating processing that occurs for either an explicit commit request or an explicit rollback request. In decisions 500 and 502, the server ascertains that the request is from the Shared File System API and routes the request to request manager 54. Next, request manager 54 locates the FCB for each work unit associated with the request (step 504). If the request is to commit (decision 506), then the request manager creates a WRB from each FCB and then deletes the FCB (steps 508 and 512) However, if the request was to rollback (decision 510), then the request manager simply deletes each FCB (step 512). Next, for each WRB created in step 508, if the request was to commit (decision 516), the request manager writes the updates to DASD (step 518) and deletes the WRB (step 522). However, if the request was to rollback (decision 520), then the request manager deletes the WRB (step 522). This completes processing of the work unit.

Data File Sharing/Concurrency

"Data filing sharing/concurrency" are the rules for controlling the number and types of concurrent access that are permitted for a file or data block. The present invention also addresses the more difficult problem of determining the rules when the file is accessed using a different API than the normal API of the file. In the illustrated example, the present invention determines "hybrid" data file sharing/concurrency rules for a Byte File System file which is accessed through the Shared File System API and Byte File System API. In the case of accessing a Byte File System object using the Shared File System API, the hybrid rules resemble more the basic Shared File System rules than the basic Byte File System rules because the (1) Shared File System API is the more restrictive/conservative and (2) it is more efficient and appropriate to accomodate the rules of the API that is in use.

The basic Shared File System rules do not allow two or more concurrent opens for write intent for the same file, i.e. there can be only one open for write intent at a time for a file and concurrent requests to open the same file for write intent (and access any block in the file) are serialized. However, while a file is opened for write intent, there can be other concurrent opens for read intent.

The basic Byte File System rules allow multiple concurrent opens for write intent and/or read intent at the file level. However, client update requests from applications are serialized with any other client requests for the same object. This is accomplished through tokens managed by a token manager 69 in server 52 for the accessed object. A object token of read or write mode is awarded by the token manager in such a way as to enforce the Byte File System rules for concurrency. These rules guarantee that any write or update request is completed atomically before another write request or read request for the same file is processed by the server 62. Thus, the Byte File System allows the same file to be opened by multiple clients or client processes with write (update) and/or read intent, i.e. multiple clients can be changing or reading the same file concurrently, but, any other requests for the file (read or write) are held up while a write request is processed. This is to insure that partial (non-atomic) writes or reads do not occur, and that any read is presented the latest changes.

The hybrid rules for a Byte File System file resulting from access using the Shared File System API are as follows. When a Byte File System file is updated through an open (with write intent) through the Shared File System API, the concurrent writer rule of the Byte File System API are overridden by the single writer rule of Shared File System API. This means that a Byte File System file opened for write intent from the Shared File System API is serialized with other Byte File System opens for write intent (regardless of which API was used to open the existing Byte File System file open(s)). Also, when another open for write is encountered, the Shared File System API open must wait for the other opens (for write) to complete (close). The converse is also true. When a Byte File System file has been opened from the Shared File System API, new opens from the Byte File System API of the same file must wait until the Shared File System API open of the file (for write) is completed before the Byte File System API open (for write) can be processed.

Whereas the basic Byte File System API and the basic Shared File System API allow concurrent opens for read intent while there is an existing open for write intent through the same API, there is one additional concurrency restriction of the hybrid rules. When a Byte File System file has been opened for write intent from the Shared File System API, subsequent opens for read intent from the Byte File System API must wait. This restriction is applied because there is a fundamental difference between the basic Shared File System rules and the basic Byte File System rules in regard to presenting file changes to readers (those that have a file open for read while there is a concurrent open for write). This is explained more thoroughly in the subsequent section entitled "Data Change Consistency". The basic Byte File System rule is that "readers" see (through reading bytes) changes as soon as those changes occur (through atomic file writes), while the basic Shared File System rule is that "readers" never see (through record reads) changes (file writes) until they close and re-open the file. Because of this fundamental difference, under the hybrid rules, the Byte File System API read is not allowed to execute concurrently with any Shared File System API write activity to the same Byte File System file.

However, there can be open for read intent requests from the Shared File System API to the same Byte File System file that has an existing open for write intent from the Byte File System API because this is allowed by the Shared File System API and, as explained below in the section entitled "Data Change Consistency", the Shared File System API readers will see (read) changes made by a concurrent write only after that reader closes and reopens the file. This conforms to basic Shared File System rules and creates no problems for the Shared File System API.

Finally, there is the matter of handling Byte File System file tokens when the file is affected by operations from the Shared File System API. Where concurrency is not permitted, such as described above, file tokens are not permitted to be held by Byte File System clients. This occurs when there is Shared File System API change activity for a file. Such change activity would cause the client metadata caches for the file to be changed and would invalidate such metadata. Therefore, the tokens that represent this metadata are invalidated when the Shared File System operation, such as an open for write intent, is initiated. This invalidation occurs by sending invalidation messages to the client environment, the receipt of which causes the client environment to disregard or throw away the associated metadata cache information. Such invalidation also causes the server to erase records that the associated client(s) have the token (s).

In addition, Shared File System API write activity for a Byte File System object, such as the open of a Byte File System file, prevents execution of subsequent operations from the Byte File System API that would cause new awards of object tokens, such as a Byte File System lookup operation for a object. In a "lookup" operation, a client passes a Byte File System object path name or other identifier to the repository server, and gets in response the latest metadata for that object, along with the award of a token that represents the client's having cached the metadata. This token is recorded by the server and revoked or called back when there are change or potential for change to the cached metadata that it represents. The restriction against token awards continues while the Shared File System write operation is active, e.g. until the Shared File System API closes the Byte File System file.

The following Table I lists permitted (Y-Yes) and not permitted (N-No) concurrencies for a Byte File System file. The column headings indicate existing opens for read or write mode through the Byte File System API and Shared File System API. The row headings indicate requested opens for read and write made through the Byte File System API or Shared File System API. Each Yes entry indicates that concurrency is permitted immediately upon the new request and each No entry indicates that the file cannot be concurrently opened at this time and consequently, either the request is rejected entirely or queued for later execution.

TABLE I

INTER-ENVIRONMENT SHARING:
BFS OBJECT:

| Affect on Opens: New vs. existing | BFS | | SFS | |
|---|---|---|---|---|
| OPEN → | READ | WRITE | READ | WRITE |
| BFS | | | | |
| READ | Y | Y | Y | N |
| WRITE | Y | Y | Y | N |
| SFS | | | | |
| READ | Y | Y | Y | Y |
| WRITE | N | N | Y | N |

OPEN = Open or other equivalent of "in-use"

The following Table II lists permitted (Y-Yes) and not permitted (N-No) new lookup requests to the repository server concurrent with an existing file open. The column headings indicate existing file opens through the Byte File System API and Shared File System API. The row headings indicate new lookup requests made through the Byte File System API. A lookup request can result in either a object read token or a object write token award as indicated by lookup read and lookup write in the row heading. This read or write mode of the object token is used to control concurrency. Each Yes entry indicates that concurrency is permitted immediately upon the new request and each No entry indicates that the meta data cannot be concurrently read at this time and consequently, the request is rejected.

TABLE II

Affect LOOKUPS (Y = Allowed) If the object is in use (open..):

| Lookup vs. existing | BFS | | SFS | |
|---|---|---|---|---|
| OPEN → | READ | WRITE | READ | WRITE |
| BFS | | | | |
| LOOKUP READ | Y | Y | Y | N |
| LOOKUP WRITE | Y | Y | Y | N |

The following Table III lists permitted (Y-Yes) and not permitted (N-No) new open access concurrent with an existing object token awards. The row headings indicate existing object token awards obtained through Byte File System API. The column headings indicate newly requested opens for read and write made through the Byte File System API and Shared File System API. Each Yes entry indicates that concurrency is permitted for the new request and each "I-Invalidate" entry indicates that the open causes the object token to be invalidated. Invalidation of object tokens is accomplished by sending a message to the client that holds the token and has the metadata cached, indicating that both the token and the metadata are invalid and must be subsequently refreshed. Such metadata data caching and token awards generally represent remnants of previous object activity or references that are retained to avoid reacquisition for subsequent activities.

TABLE III

Affect on Existing Cache (Old LOOKUPS) of OPENS:

| Open vs. existing Cache ↓ | BFS | | SFS | |
|---|---|---|---|---|
| | READ | WRITE | READ | WRITE |
| BFS | | | | |
| OBJECT TOKEN READ | Y | Y | Y | I |
| OBJECT TOKEN WRITE | Y | Y | Y | I |

I = Invalidation forced by SFS OPEN

Figure 8:
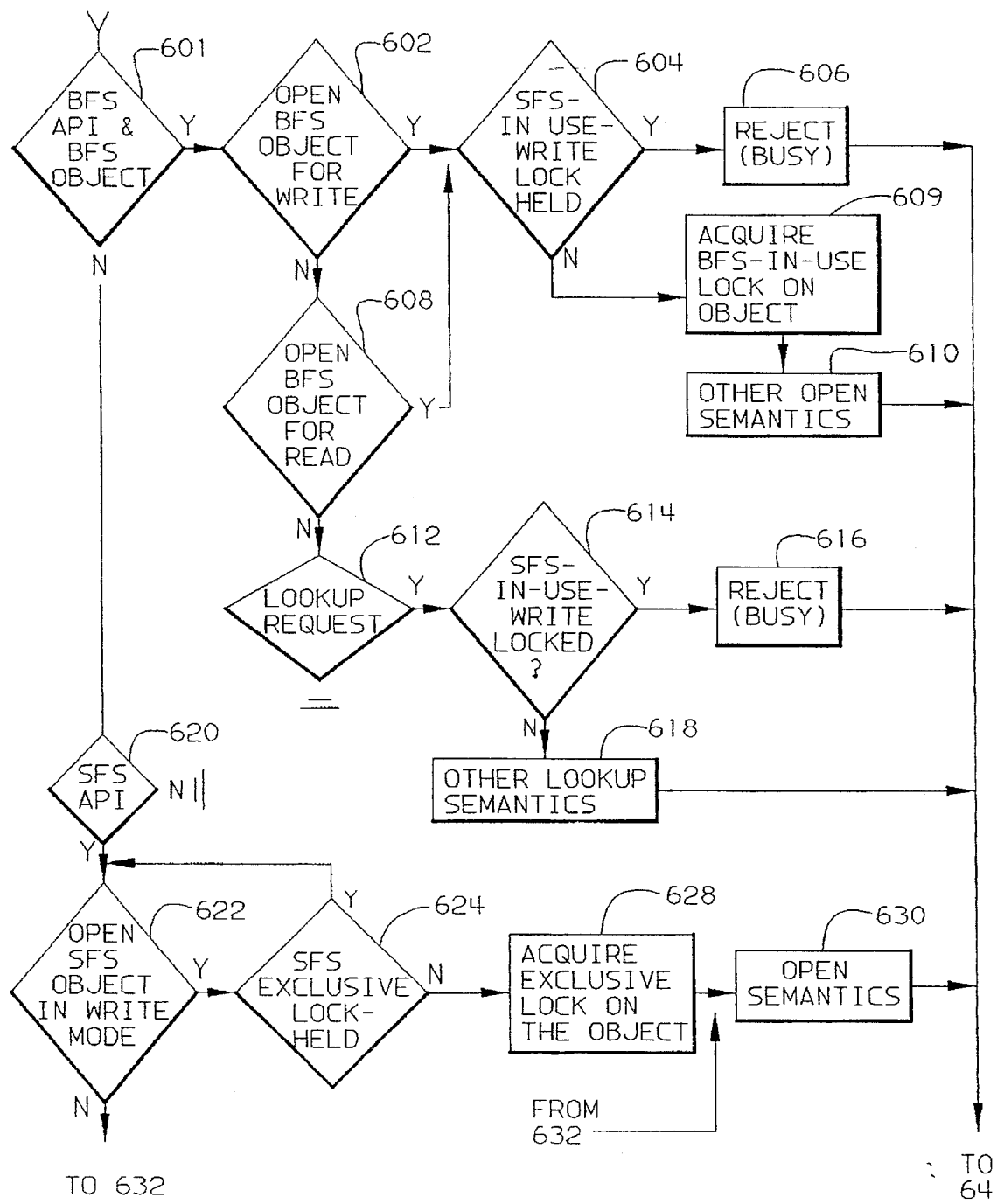
FIG. 8 is a flow chart illustrating processing of concurrent access requests within the computer system of FIG. 1.
Figure 8B:
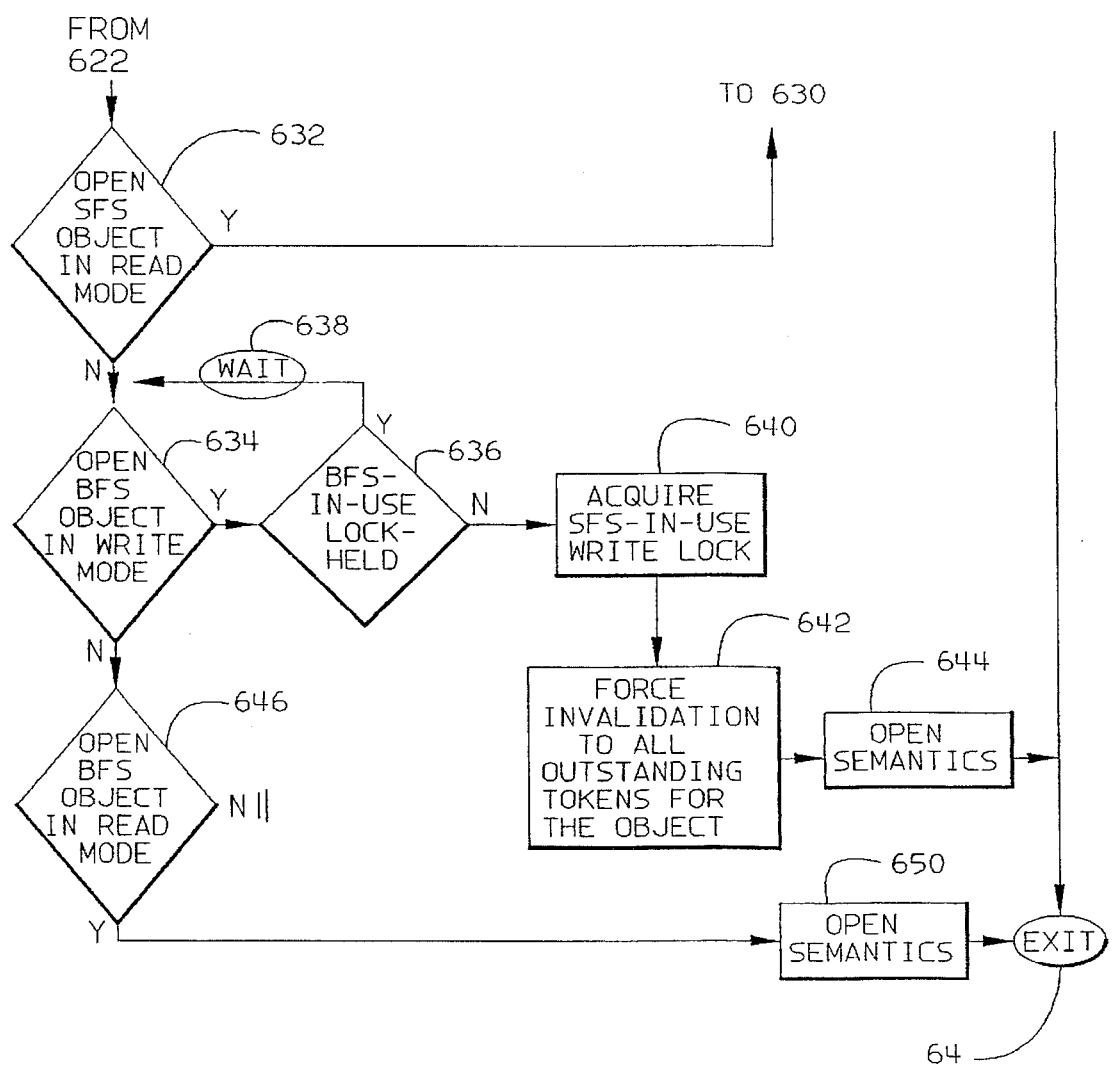

FIG. 8 is a flow chart illustrating a process for implementing the foregoing rules for data sharing/concurrency. Before explaining the steps of the flow chart, note that the flow chart references three types of locks. A "Shared File System exclusive lock" insures only one writer/updater at a time for a Shared File System file from the Shared File System API. A "Byte File System in-use lock" prevents a new opening of a Byte File System file for write mode from the Shared File System API while there is an outstanding open (for read or write) from the Byte File System API for the same file. A "Shared File System in-use write lock" prevents opening of a Byte File System file from the Byte File System API while there is an outstanding writer to the same file from the Shared File System API.

In decision 600 of the flow chart of FIG. 8, the server determines if the request uses the Byte File System API (for accessing a Byte File System file). If so, the server routes the request to the Byte File Server request manager 56 which then determines if the current request is to open the file for write mode or read mode (decisions 602 and 608). In either case, the request manager 56 then determines if there is an outstanding Shared File System in-use write mode lock held (decision 604). If so, the current request is rejected because the file is "busy" (step 616). However, if there is no outstanding Shared File System in-use write mode lock held, then the requestor is granted a Byte File System in-use lock on the specified file (step 609) and then the file is opened as described above (step 610). Referring back to decisions 602 and 608, if the current request is not to open the Byte File System file, then the request manager 56 determines if the request is for look-up (decision 612). If so, the request manager 56 then determines if there is an outstanding Shared File System in-use write lock on the file. If so, the request manager rejects the current request (step 616) as the file is "busy". However, if not, then the request manager 56 performs the look-up by requests (step 618).

Referring back to decision 600 and to decision 620, if the current request uses the Shared File System API, the server routes the request to the request manager 54 and the request manager determines if the current request is to open a Shared File System file for write (decision 622). If so, the request manager determines if there is an outstanding Shared File System exclusive lock on the file (decision 624). If so, the request manager 54 waits until the lock is voluntarily relinquished (step 626). However, if there is no outstanding Shared File System exclusive lock on the file, then the request manager 54 grants the requestor an exclusive lock on the file (step 628) and then performs the open function (step 630). Referring back to decision 622, if the current request is not to open in write mode but to open a Shared File System file for read decision 622, then the request manager 54 performs the open function (step 630).

However, if the current request is to open a Byte File System file for write (decision 634), then request manager 54 through the crossover manager 68 determines if there is an outstanding Byte File System in-use lock on the file (decision 636). If so, then the crossover manager 68 waits until the lock is voluntarily relinquished (step 638). However, if there is no outstanding Byte File System in-use lock on the file, then the crossover manager 68 grants the Shared File System in-use write lock to the requestor (step 640). Then, the crossover manager 68 forces an invalidation to all outstanding tokens for the file (step 642) and then performs the open function (step 644). Referring back to decision 634 and decision 646, if the current request is to open a Byte File System file for read, then crossover manager 68 performs the open function (step 650).

Data Change Consistency

"Data change consistency" relates to control of when updates are presented to other clients who are currently reading or will subsequently read a file which has been updated. According to the basic rules of the Byte File System API (for Byte File System files), changes are presented to concurrent readers with the next read operation that follows 30 a commit of an atomic update operation. Because each individual write operation is committed individually, each completed write causes that change to be reflected in the new and subsequent reads of data from the same file. However, the basic rules of the Byte File System API do not permit an update and a read to take place at exactly the same time. When a write operations is initiated, it is delayed if there are any current read operations active for the same object, and that delay continues until all such current read operations complete. Conversely, a new read operation must wait if there is a current write operation in progress for the same file, and that wait continues until the write operation completes. However, when there are no write or update operations in progress, any number of read operations can be executed concurrently to the same object, because this does not affect enforcement of read consistency or write concurrency rules.

According to the basic rules of the Byte File System API, (for Byte File System objects) both write concurrency and read consistency rules are enforced through object tokens. There are object write tokens, which can be awarded and held by only one client at a time. Holding a object write token insures that there are no other holders of such a token and that there are also no other holders of a read token for the same object. On the other hand, there can be multiple client holders of a read token for the same object, which allows for multiple concurrent reads by clients, but these read tokens are awarded and held only while there are no write tokens awarded for the same object.

These token rules are enforced by token manager 69 in the server 52. This is described further in U.S. patent application entitled "Optimized Read Ahead in Token Managed System", Ser. No. 08/525,919, filed Sep. 8, 1995 by Robert Bennett, Eugene Johnson and Terrence Woodnorth. This token manager keeps a record of which clients hold which object tokens and enforces the rules summarized above. This enforcement is through a system of token awards and token callbacks. Tokens are awarded to clients based on the rules for concurrently holding tokens for the same object. These rules are exactly those summarized above for ensuring concurrency and consistency rules of the basic Byte File System API (for Byte File System objects). These rules are enforced by appropriately calling back tokens held by other clients and not awarding the tokens to the currently requesting client until the callbacks are completed. For the clients that are the targets of such callbacks, the rules require them to return the tokens as soon as they complete any current operations for which the tokens were awarded, i.e. they are to complete the processing of any in-progress client requests, but they are not to start processing any new client requests. In the case of the callback of object write tokens, these callback target clients must also return with the callback response any updates or changes to the associated objects at the same time that they acknowledge the callback(s) and return the requested token(s). Only when the server 52 gets all callback responses and applies any changes to the object that is associated with the callback response, can it award the token to the client requestor that caused the token callbacks originally. This system of serialized token awards enforces the rules for consistency and concurrency in the basic Byte File System API (for Byte File System objects).

Figure 9:
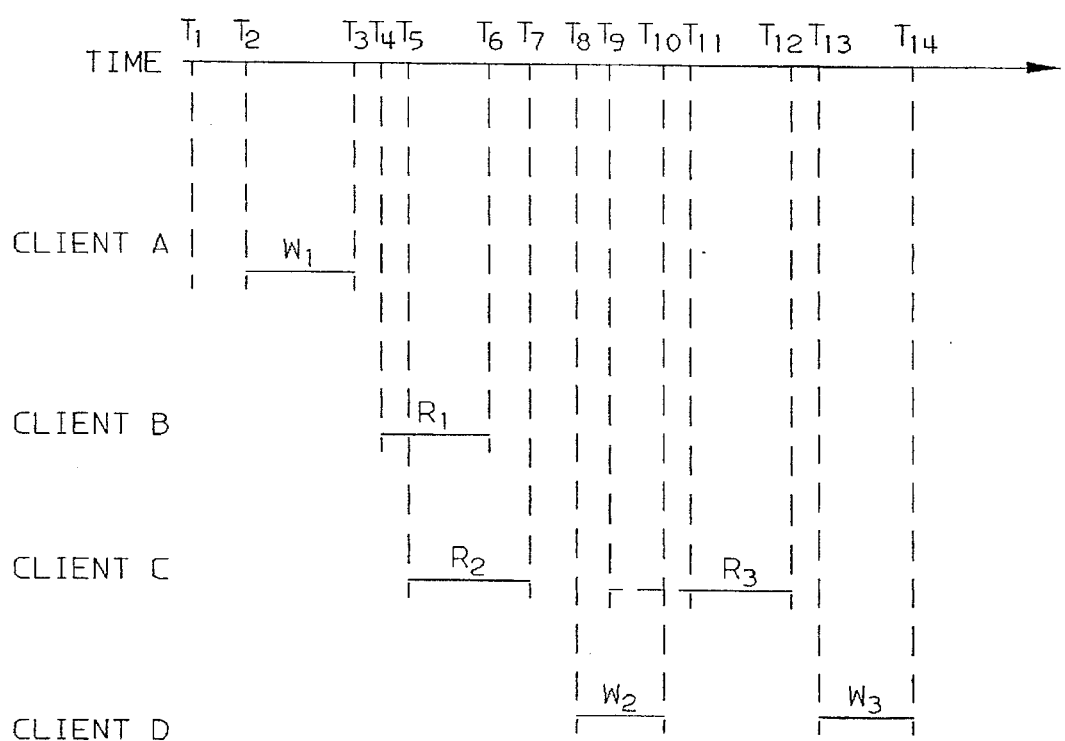
FIG. 9 is a time graph illustrating an example of concurrent access to a Byte File System object using the Byte File System API within the computer system of FIG. 1.

FIG. 9 is a timing diagram example illustrating a sequence of read and write operations. Client A requests a object write token at time t1, obtains the token and starts a write operation W1 at time t2 and completes a write operation W1 at time t3. While it holds this write token, the server 52 receives a read request R1 for the same object from Client B, calls back the object write token from Client A, and gets a response from Client A that relinquishes the token (after the object has been updated to reflect the W1 changes). Then the server awards a object read token to Client B at time t4 and completes the read operations R1 at time t6. Meanwhile, Client C also requests a read operation on the same object, overlapping with the previous read operation R1 and is concurrently awarded a object read token at time t5. The rules do not preclude such concurrent read operations. R1 completes at time t7.

Then Client D requests a write operation on the same object at time t8, causing a callback of both the object read tokens held by Clients B and C. When the callbacks are complete, Client D is awarded the object write token and allowed to go ahead with the write operation. Meanwhile, Client C starts another read operation for the same object at time t9. The server sends a callback to Client D for the object write token, but the response to this callback is delayed until Client D completes its current write operations W2 at time t10. Client D's return of the object write token corresponds with the committed object changes for the W2 operation so that the pending read by Client C will properly reflect those changes. By time t11, Client C can begin the actual read of data in the common object. This completes at time t12. Finally, Client D again submits a write operation W3 and at time t13, the server must callback the object read token from Client C. When this callback is complete the current Client D write operation can continue to completion at time t14.

The basic rules for read consistency in the Shared File System API for Shared File System objects ensure consistency of reads during the time that a file is open. These rules ensure that when a client opens a file for read intent it will get the same consistent view of the data in that file until that client closes the file. This has the advantage of allowing an application to not be disturbed by changes that would perhaps present unacceptable and inconsistent results with other values in the same file open instance. This open-to-close consistency is not to be confused with the basic Shared File System rules for atomicity, which allows for commits to span multiple client application or user requests or even to span multiple client open for write and closes without committing. This means that, although a concurrent writer may be changing a file and such changes may by committed in work unit groupings, concurrent opens for read of the same file will not reflect any of the changes until that file is closed by the reader and opened again, independent of how many times the file is opened, closed and committed by a concurrent writer.

Figure 10:
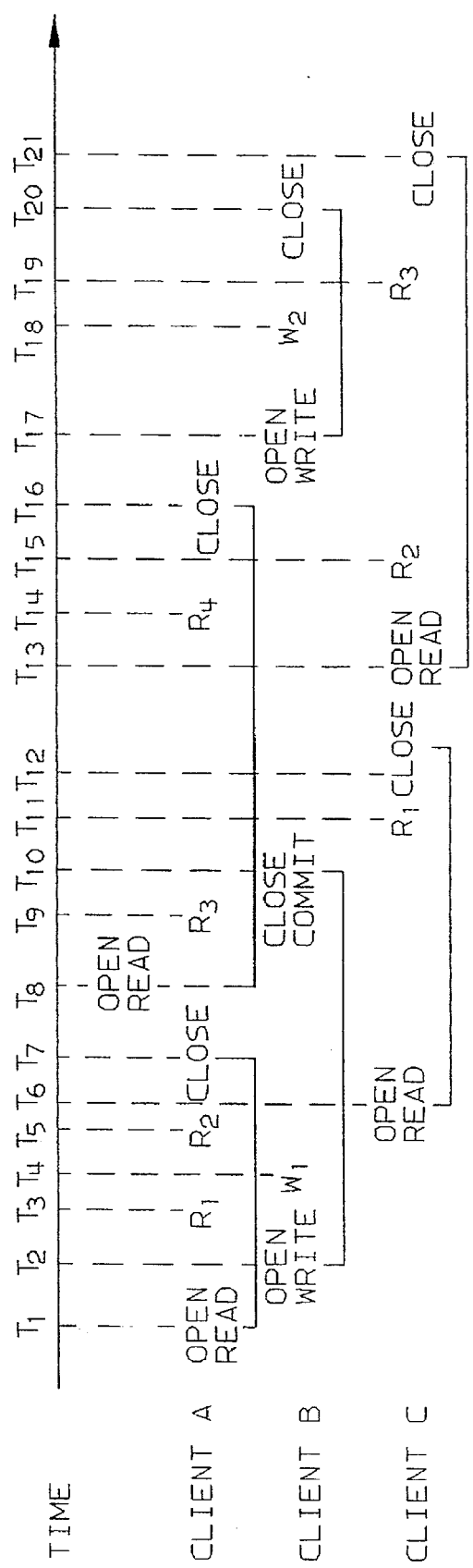
FIG. 10 is a time graph illustrating an example of concurrent access to a Byte File System object or Shared File System object using the Shared File System API within the computer system of FIG. 1.

FIG. 10 is a time line illustrating the basic read consistency rules of the Shared File System API for Shared File System files. At time t1 is an open for read intent by Client A, followed by an overlapping open for write intent by Client B at time t2. Neither the R1 read at time t3 nor the R2 read at time t5 by Client A is affected by the W1 write at time t4 by Client B. Likewise, after the close of the first open by Client A at time t7 and re-open of the same file by the same client at time t8, the R3 read at time t9 would still not reflect changes to the common file because Client B has not committed the change made by the W1 write (time t4). Even after Client B closes and commits the W1 change at time t10, the R4 read at time t14 by Client A still does not reflect the W1 change by Client B because the second open for read intent at time t8 occurred before the close commit at time t10 by Client B. Similarly, a R1 read at time t11 by Client C does not reflect the W1 change by Client B because the open at time t6 occurred before the Client B closed/commited at time t10. However, the R2 read at time t15 by Client C does reflect the W1 change by Client B because the open for read intent by Client C at time t13 occurred after the commit of the W1 change by Client B at time t10.

A subsequent read R3 at time t19 by Client C does not reflect a change W2 at time t18 by Client B because 1) the open under which the R3 read of Client C occurred was done at a time t13 even before the open by Client B at time t17 for the W2 change, and 2) the work unit under which the W2 change was made has not been committed in the span of time shown in the time line of the illustration.

When Byte File System files are opened using the Shared File System API (a "hybrid" situation), there are no rule changes compared to opening of the Byte File System using the Byte File System API as long as the open is with read intent. In this case there are no read consistency concerns because there are no objects with which to be concerned. However, if the Shared File System API is used to open a Byte File System file for write intent, the difference between the read consistency rules must be resolved. Because the Shared File System API is used, the basic rules for the Shared File System API (for accessing a Shared File System object) are favored, but this is done in such a way as not to conflict with concurrent Byte File System operations for the same file. The previously described concurrency rules for the Shared File System API changes to Byte File System files already prevents either a read or a write intent open of a Byte File System file while the Shared File System API has that file open for write intent, so read consistency of such Byte File System API operations with Shared File System API operations is already ruled out and requires no further resolution.

The hybrid rules are as follows for Shared File System API opens for read intent of a Byte File System file with the concurrent Shared File System API open for write intent of the same file. In this case, the basic Shared File System API is favored as it represents the origination of the operations. Open-to-close consistency rules are applied, whereby write operations have no affect on concurrent read operations until the common file is closed and re-opened by the reader. This can be illustrated by FIG. 10 and the previous description of that illustration. The Shared File System request manager 54 in FIG. 1 handles the read consistency method for Shared File System files pursuant to the Shared File System API. For further details, reference can be made to U.S. Pat. No. 5,043,876 to Charles Terry, which patent is hereby incorporated by reference as part of the present disclosure. The Byte File System crossover manager 68 uses this same method and set of read consistency rules when a Byte File System file is opened by one or more clients from the Shared File System API for read intent relative to other opens for write intent for the same file through the same Shared File System API.

Based on the foregoing, a heterogeneous filing system with common API and reconciled file management rules has been disclosed. However, numerous modifications and substitutions can be made without deviating from the scope of the present invention. For example, in the foregoing description of commits, changed data blocks were stored in memory (RAM) until commit time. However, for the Shared File System this may require too much memory because a single work unit can encompass a multitude of write operations and possibly a multitude of data blocks. Therefore, in an alternate implemention, an optimization is employed whereby data blocks are written to DASD with each write operation, not waiting until commit time. However, rather than updating the blocks "in place", i.e. overwriting the same block with changes, a new DASD block is allocated as they are needed for the new changes. This allows for keeping both the old (shadow) blocks on DASD and the changed data blocks on DASD until the time of the commit of those blocks. The commit is accomplished by committing the metadata from the WRBs to the metadata storage area for the file on DASD. Among other things, this metadata includes the set of physical block identifiers of current blocks that are in effect for the file and this set includes the updated and new blocks, but not old versions of blocks. Finally the commit deallocates the old blocks on DASD. Should a rollback become necessary, instead of the commit, the new blocks are deallocated on DASD and the current version of the metadata for the file is retained on DASD, where it reflects the current (unchanged) mappings of DASD blocks for the file, and the current WRB is released (unused). For read consistency, previous versions of changes (shadowed blocks) on DASD are retained as long as needed for concurrent read opens. The shadow blocks are used to retain old versions of blocks that are needed to implement the open-to-close read consistency required for the Shared File System rules.

Therefore, the invention was disclosed by way of illustration and not limitation, and reference should be made to the following claims to determine the scope of the present invention.

We claim:

1. A computer system for managing first and second different file systems, said system comprising:

first and second different file managers having first and second different APIs for said first and second file systems, respectively; and hybrid means for controlling atomicity of said second file system based on requests made using said first API, at least one request permitted under said second API for access to said second file system not being permitted with concurrent access to said second file system using said first API such that said one request does not violate file management rules of said second API.

2. A computer system as set forth in claim 1 wherein said plurality of updates are made to a respective plurality of files.

3. A computer system as set forth in claim 2 wherein said hybrid means supports a plurality of explicit update requests to a same file and execution of said plurality of update requests before said combined close and commit request but does not support another plurality of explicit update requests to a plurality of files and execution of said other plurality of explicit update requests before a combined close and commit request.

4. A computer system as set forth in claim 1 wherein when said second file system is open for write from said second API said second API permits an open for read from said second API but when said second file system is open for write from said first API, said hybrid means does not permit an open for read from said second API.

5. A computer system for managing first and second different file systems, said system comprising:

first and second different file managers having first and second different APIs for said first and second file systems, respectively; and hybrid means for managing said second file system based on requests made using said first API, said hybrid means applying rules from both APIs to control access concurrency, said rules being the more restrictive rules of said second API.

6. A computer system for managing first and second different file systems, said system comprising:

first and second different file managers having first and second different APIs for said first and second file systems, respectively; and hybrid means for controlling data change consistency of said second file based on requests made using said first API, said requests not violating file management rules of said second API.

7. A computer system for managing first and second different file systems, said system comprising:

first and second different file managers having first and second different APIs for said first and second file systems, respectively, said first API supporting an explicit commit request following an explicit close request and execution of said close request and a combined close and commit request following an explicit update request and execution of said update request, said first API not committing updates pursuant to an explicit update request, said second API, in response to an explicit update request, executing said update request and automatically committing resultants updates if successful; and hybrid means for managing said second file system based on requests made using said first API, said hybrid means supporting an explicit, combined close and commit request following an explicit update request and execution of said update request and supporting an explicit rollback request following an explicit update request but not supporting an explicit close request without combined commit request.

8. A computer system as set forth in claim 7 wherein said first API and said first file manager support a plurality of explicit update requests and execution of said plurality of update requests followed by an explicit, commit request for said plurality of updates collectively.

9. A computer system for managing first and second different file systems, said system comprising:

first and second different file managers having first and second different APIs for said first and second file systems, respectively, said first API does not present committed updates to a concurrent reader until after said concurrent reader closes the respective file and reopens said respective file, said second API presents updates to a concurrent reader after said updates are committed and before said concurrent reader closes the respective file; and hybrid means for managing said second file based on requests made using said first API, said hybrid means does not present committed updates to a concurrent reader until after said concurrent reader closes the respective file and reopens said respective file.

10. A computer system as set forth in claim 9 wherein when said second file system is open for write from said first API, said hybrid means does not permit an open for read from said second API, whereby there are no readers from said second API currently available to read updates from said first API.

11. A computer system for managing first and second different file systems, said system comprising:

first and second different file managers having first and second different APIs for said first and second file systems, respectively, said first API serializing requests to open for write at a file level, said second API permitting concurrent opens for write at a file level; and hybrid means for managing said second file system based on requests made using said first API, said hybrid means serializing requests to open for write at a file level.

12. A computer system as set forth in claim 11 wherein said first file manager and said first API support concurrent opens for read at a file level and an open for read at a file level concurrent with an open for write at a file level.

13. A computer system as set forth in claim 12 wherein said first file manager and said first API support concurrent opens for read at a file level concurrent with an open for write at a file level.

14. A computer system as set forth in claim 11 wherein said second file manager and said second API support concurrent opens for read concurrent with an open for read at a file level concurrent with an open for write at a file level.

15. A computer system as set forth in claim 14 wherein said second file manager and said second API support concurrent opens for read at a file level concurrent with an open for write at a file level.

16. A computer system as set forth in claim 11 wherein when said second file system is open for write from said first API, said hybrid means does not permit an open for read from said second API.

17. A computer system as set forth in claim 16 wherein when said second file system is open for write from said first API, said hybrid means permits an open for read from said first API.

18. A computer system as set forth in claim 17 wherein when said second file system is open for write from said first API, said hybrid means permits a plurality of opens for read from said first API.

19. A computer system as set forth in claim 11 wherein when said second file system is open for read from said first API, said hybrid means permits a plurality of opens for read from said second API.

20. A computer system as set forth in claim 19 wherein when said second file system is opened for read from said first API, said hybrid means permit a plurality of opens for read from said first API.

21. A computer system as set forth in claim 11 wherein when a file in said second file system is requested to be opened from said first API and there is an outstanding token for a same file issued via said second API, then said hybrid means invalidates said token.

22. A computer system as set forth in claim 11 wherein when said second file system is requested to be opened from said first API, then said hybrid means prevents awards of tokens for said second file system via said second API.

* * * * *